United States Patent

[11] 3,574,411

[72] Inventor Claude J. Miller
 Muncy, Pa.
[21] Appl. No. 791,434
[22] Filed Jan. 15, 1969
[45] Patented Apr. 13, 1971
[73] Assignee Sprout, Waldron & Company, Inc.
 Muncy, Pa.

[54] SIDE INLET ROTARY VALVE
 4 Claims, 3 Drawing Figs.
[52] U.S. Cl. ..................................... 302/49,
 222/365
[51] Int. Cl. .......................................... B65g 53/40
[50] Field of Search........................................ 302/49;
 198/62; 222/194, 368

[56] References Cited
 UNITED STATES PATENTS
2,886,216  5/1959  Oholm............................  302/49
3,224,813  12/1965  Jezo ..............................  302/49
3,311,420  3/1967  Halstead.......................  302/49
3,399,931  9/1968  Vogt..............................  302/49

Primary Examiner—Andres H. Nielsen
Attorney—Howson and Howson

ABSTRACT: A side inlet rotary valve for delivery of particulate material into a pneumatic conveyor system characterized by a vane-type rotor mounted for rotation about a horizontal axis in a generally cylindrical casing; the casing includes a downwardly opening outlet port connected to the pressurized system, a side inlet for introducing the material into the rotor chambers, and a pressure relief port above said side inlet for relief of pressure carried by the rotor chambers into the inlet region.

PATENTED APR13 1971
3,574,411
FIG. 1.
FIG. 2.
FIG. 3.
Inventor:
Claude J. Miller
by Howson & Howson
Attys.
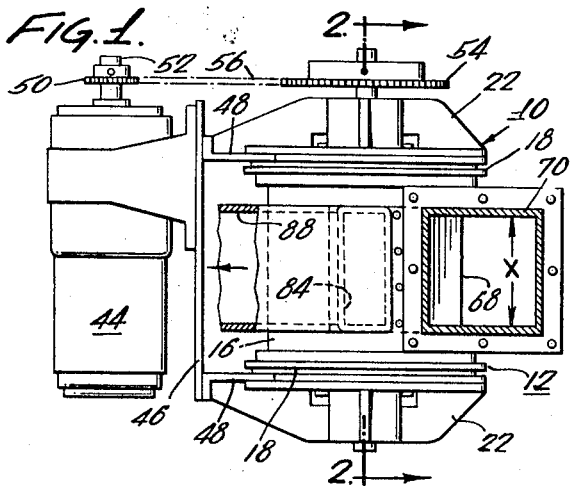
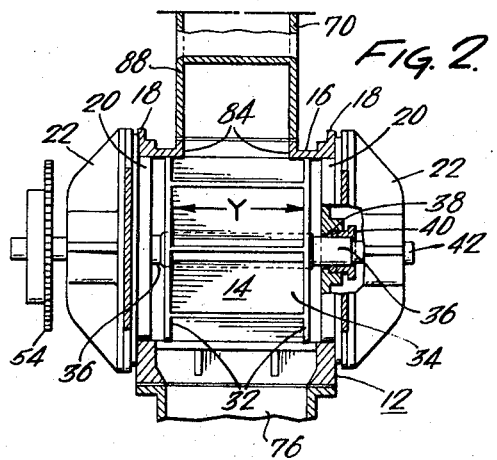
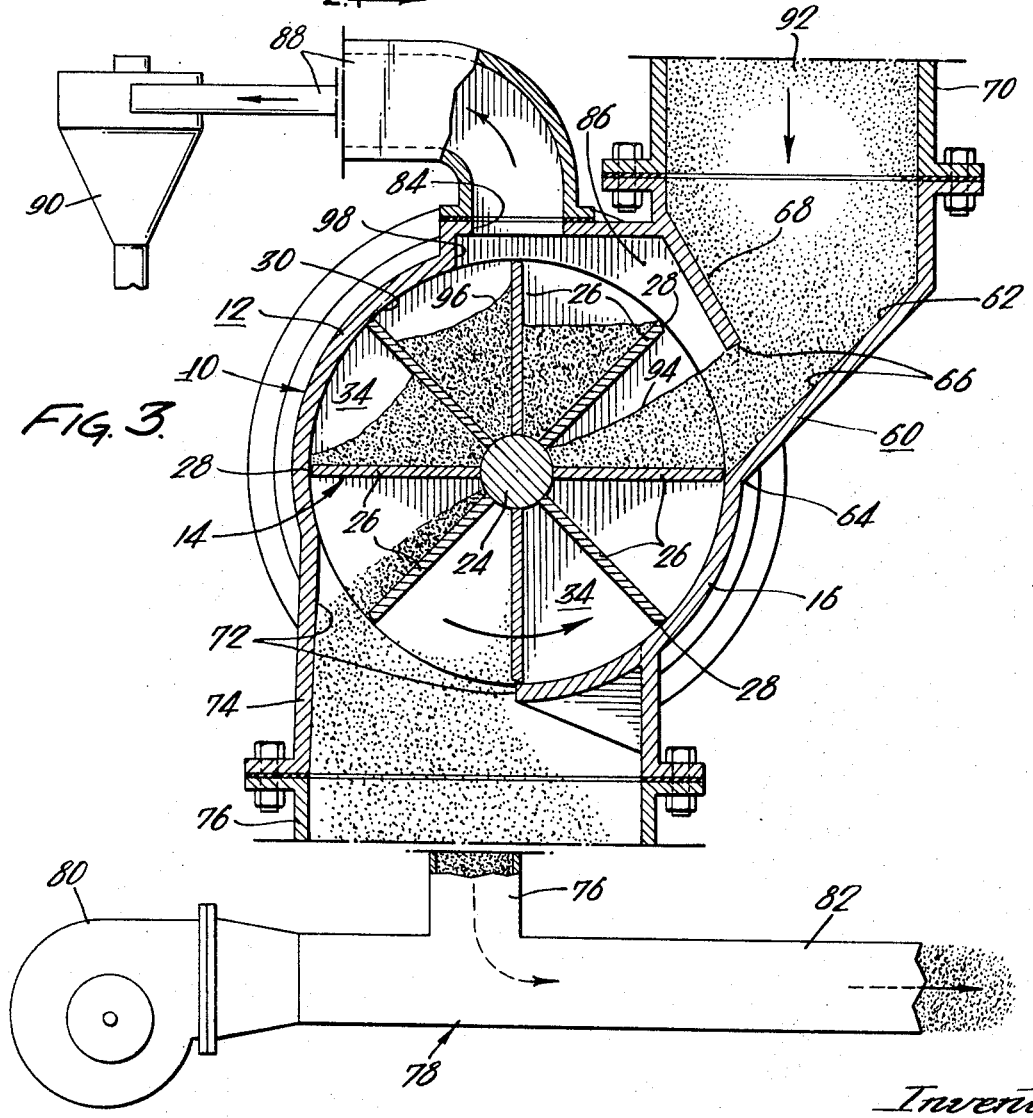

SIDE INLET ROTARY VALVE

The present invention relates generally to rotary valves for the metered feeding of particulate materials and relates more specifically to a side inlet rotary valve adapted for the delivery of materials into a pneumatic conveyor system.

Rotary valves are presently in widespread use for the metered delivery of granular free-flowing materials such as pellets, wood chips, and the like. A typical application of such a valve is in the feeding of materials from a storage hopper into a conveying system for transfer of the materials at a predetermined rate into processing equipment. Rotary valves are characterized in general by a cylindrical casing within which is rotatably mounted in a vane-type rotor. The rotor and casing define a series of compartments which, upon rotation of the rotor, accept material flowing under gravity force through a top inlet port and discharge the material through a port in the bottom of the casing. The rate of material delivery is dependent essentially on the speed of rotation of the valve rotor, the size of the inlet opening, and the flow characteristics of the material being transferred.

The top inlet-type rotary valve cannot be satisfactorily used with the more fragile granular materials because of the tendency of the materials to shear between the edges of the vanes and the wall of the casing. To overcome this problem, rotary valves have been constructed with the material inlet in the side of the casing opening into the upwardly moving rotor vanes so that the material will settle down into the rotor compartments by the time the compartments are sealed by the cylindrical casing wall, normally just beyond the top dead center vane position.

The side inlet valve works well when delivering granular materials onto a mechanical conveyor. However, when a pneumatic conveying system is utilized, the higher pressure at the valve discharge port charges the returning rotor compartments with high-pressure air. The pressurized compartments upon opening into communication with the inlet port disrupt the inflow of materials and, under some circumstances, cause material inflow into the valve to become completely stopped.

In the present invention, the casing of the side inlet rotary valve is provided with a pressure relief port which is located above the material inlet port and provides an exhaust passage for the high-pressure air which is carried from the bottom outlet port by the empty returning rotor compartments. By providing such a pressure relief, the material input into the casing continues smoothly and without interruption over the normal range of operating speeds of the valve and relatively high pneumatic conveying pressures may be employed below the valve without affecting valve operation.

It is accordingly a primary object of the present invention to provide a side inlet rotary valve for use with pneumatic conveying systems which will provide a smooth uninterrupted material flow at relatively high outlet port pressures.

Additional objects of the invention will be more readily apparent from the following detailed description of an embodiment thereof when taken together with the accompanying drawings, in which:

FIG. 1 is a plan view of a side inlet rotary valve in accordance with the present invention;

FIG. 2 is a sectional view taken along line 2-2 of FIG. 1 and partly broken away to show details of the rotor shaft seal; and FIG. 3 is an enlarged vertical sectional view through a side inlet rotary valve of the type shown in FIGS. 1 and 2 schematically showing the manner in which the valve is connected with a pneumatic conveying system and showing the passage of particulate material therethrough.

Referring to the drawings, the side inlet rotary valve generally designated 10 embodying the present invention includes a valve casing 12 having a vane-type rotor 14 rotatably mounted about a horizontal axis therein. The casing 12 includes a central cylindrical portion 16 having end flanges 18 against which are secured the casing ends 20 and bearing housings 22 within which are located the outboard rotor shaft bearings.

The rotor 14 includes a shaft 24 from which a plurality of vanes 26 extend radially, the outer vane edges 28 being in closely fitting relation with the inner surface 30 of the casing portion 16. The vanes 26 extend axially between the rotor shrouds 32 which with the vanes and the casing inner wall 30 form the rotor compartments 34.

As shown in FIG. 2, the shaft portions 36 outboard of the shrouds 32 pass through the casing ends 20 wherein are mounted seal rings 38 held in position by packing gland elements 40. The shaft ends 42 are journaled in bearings (not shown) in the bearing housings 22 located outboard of the rotor to keep the bearings free of foreign matter and to minimize bearing wear and rotor misalignment.

As shown in FIG. 1, the rotor is driven in rotation by a gear motor 44 which is mounted on plate 46 secured to mounting brackets 48 integral with the casing ends. A sprocket 50 on the gear motor output shaft 52 is connected with a larger sprocket 54 on the extending end of the rotor shaft 24 by a suitable drive chain 56 shown schematically in FIG. 1.

As shown in FIG. 3, the cylindrical profile of the casing portion 16 is interrupted in the upper casing region by the material side inlet generally designated 60 which includes a material trough 62 inclined at approximately 45° to the horizontal and which intersects the casing along its horizontal centerline at 64. The casing includes a material inlet port at 66 above the centerline 64 through which material may pass into the rotor compartments 34 which are sequentially presented thereto upon counterclockwise rotation of the rotor. A gate 68 which is inclined at approximately 30° to the vertical limits the quantity of material which may flow into the rotor compartments, the quantity also being determined as indicated above by the speed of rotation of the rotor and the angle of repose characteristic of the flowing material. The width $X$ of the inlet trough 62 as shown in FIG. 2 is narrower than the axial width $Y$ of the rotor compartments. The trough 62 in a typical installation is connected by conduit 70 to a material storage hopper (not shown) positioned above the valve to permit a gravity feed of the material into the valve.

Diametrically opposed from the inlet 66 is an outlet port 72 in the lower region of the casing through which the material may drop by gravity from the rotor compartments during rotation of the rotor. A flanged casing extension 74 depending downwardly from the port 72 is, in a typical installation, connected by the material conduit 76 to a pneumatic conveying system 78, a portion of which is schematically indicated as including a centrifugal blower 80 and a material conveying duct 82 through which the material is driven by the pressure produced by the blower. While air is normally employed as the conveying medium, other gases such as nitrogen may also be used.

To prevent the disruption of material flow through the inlet 66 by the release of high-pressure air thereinto from the upwardly moving empty rotor compartments, pressure relief means are provided in the form of a pressure relief port 84 in the casing located above the inlet 66. The cylindrical casing wall 30 is discontinued in the region 86 between the inlet 66 and the relief port 84 to permit the discharge of high-pressure air upwardly past the inlet. The air may pass into the region 86 through the entering particulate material or around the material. In addition, since the inlet passage as illustrated in FIG. 2 is preferably of a width $X$ substantially smaller than the axial width $Y$ of the rotor compartments, ample room is also provided at each side of the material flow to permit the upward escape of the pressurized air from the compartments as they successively open into the inlet region.

If the material handled is of a type which in handling generates a substantial amount of dust, the relief port 84 may be connected as illustrated in FIG. 3 by a conduit 88 leading to a cyclone-type separator 90. Alternatively, the relief port 84 may be covered by a filter thereby permitting the pressurized air to be released into the atmosphere while retaining the dust within the valve.

The operation of the valve is to a large extent obvious from the foregoing description. With a head of granular free-flowing material disposed above the inlet trough 62, and with the blower 80 directing a flow of air or other suitable conveying gas into the conveying duct 82, the gear motor 44 is operated at a speed selected to give the desired throughput of material. With the rotor rotating counterclockwise as viewed in FIG. 3, as each rotor compartment 34 is presented to the inlet 66, the high-pressure air in the compartment is released into the region 86 and exhausted out of the relief port 84 into conduit 88 and the separator 90. At the same time, the granular material 92 flows into the empty compartment in an amount limited by the angle of repose 94 characteristic of the material, the speed of rotation of the rotor, and the dimensions of the inlet opening 66. As the rotor vanes approach a vertical attitude, the material introduced therebetween settles toward the shaft 24 causing the material level 96 of each compartment to be spaced below the vane edges 28, thereby preventing the crushing or shearing of the granular material between the vane edges and the casing shoulder 98 which is angularly spaced beyond the vertical casing centerline. As each compartment communicates with the outlet port 72, the material therein drops freely into the casing extension 74, conduit 76 and thence into the duct 82 wherein it is entrained in an airstream for propulsion into a processing area. The communication of the compartments with the outlet port charges the compartments with high-pressure air which is carried around to the inlet region and is exhausted through the relief port 84.

From the foregoing it can be understood that the flow of materials through the inlet 66 will not be affected by the release of pressurized gas from the rotor compartments. By provision of the relief port 84 above the inlet 66 and a suitable relief of the casing wall in the region 86 coupled with the width of the inlet $X$ being smaller than the width of the rotor compartments $Y$ permits a smooth passage of the pressurized air around each side of the inflowing materials to the region 86 and out the relief port 84. Consequently, material input into the rotor is smooth and uninterrupted over the operating speed range of the valve. With the present structure, pressures in the output region as high as 10 to 12 p.s.i. are permissible whereas with conventional valves this pressure is normally limited to about 4 p.s.i.

Manifestly, changes in details of construction can be effected by those skilled in the art without departing from the spirit and scope of the invention as defined in and limited solely by the appended claims.

I claim:

1. A rotary valve for metered delivery of particulate material into a pneumatic conveyor system comprising a generally cylindrical casing having a pressure relief port in the upper portion of the casing and a material outlet port in the lower portion of the casing for connection to a pneumatic conveyor system, a rotor rotatably mounted in said casing for rotation in a predetermined direction relative to said pressure relief and outlet ports and having a plurality of radial vanes defining therebetween a succession of compartments for receiving an conveying particulate material, means defining a material inlet port in one side of the cylindrical casing intermediate said outlet and pressure relief ports and disposed in advance of the pressure relief port with respect to the direction of rotation of the rotor so that material entering the casing through said inlet port is deposited in successive rotor compartments prior to passage thereof past the pressure relief port, the said inlet port being spaced from said pressure relief port and constructed and arranged to provide an angle of repose of the material operable to only partially fill each successive compartment of the rotor, the outer edges of the radial vanes being in sealing engagement with the inner wall of the cylindrical casing intermediate said pressure relief and outlet ports and intermediate said outlet and inlet ports, and means of the casing defining a pressure relief recess within the casing radially outward of the rotor vanes and extending between the inlet and pressure relief ports in communication therewith.

2. A rotary valve as claimed in claim 1 wherein the axial width of said rotor compartments is greater than the width of the material inlet port in said casing.

3. A rotary valve as claimed in claim 1 wherein said pressure relief port includes means preventing the passage of material particles into the atmosphere.

4. A rotary valve as claimed in claim 3 wherein said latter means comprise a dust separator, and a conduit connecting said relief port with said separator.